US012720515B2

(12) United States Patent
Chen et al.

(10) Patent No.: US 12,720,515 B2
(45) Date of Patent: Aug. 25, 2026

(54) MEDIUM ACCESS CONTROL CONTROL ELEMENT FOR UPDATE OF SPATIAL RELATION CONFIGURATION

(71) Applicant: QUALCOMM Incorporated, San Diego, CA (US)

(72) Inventors: Yitao Chen, San Marcos, CA (US); Mostafa Khoshnevisan, San Diego, CA (US); Ruiming Zheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 18/565,944

(22) PCT Filed: Aug. 5, 2021

(86) PCT No.: PCT/CN2021/110792
§ 371 (c)(1),
(2) Date: Nov. 30, 2023

(87) PCT Pub. No.: WO2023/010394
PCT Pub. Date: Feb. 9, 2023

(65) Prior Publication Data
US 2024/0267901 A1 Aug. 8, 2024

(51) Int. Cl.
*H04W 72/0453* (2023.01)
*H04W 72/231* (2023.01)

(52) U.S. Cl.
CPC ..... *H04W 72/0453* (2013.01); *H04W 72/231* (2023.01)

(58) Field of Classification Search
None
See application file for complete search history.

(56) References Cited

U.S. PATENT DOCUMENTS 11,271,699 B1 * 3/2022 Eyuboglu ............ H04J 11/0079
11,671,954 B2 * 6/2023 Davydov .............. H04W 72/23 370/329

(Continued)

FOREIGN PATENT DOCUMENTS

WO WO-2021143380 A1 7/2021

OTHER PUBLICATIONS

3GPP TS 38.321: "3rd Generation Partnership Project, Technical Specification Group Radio Access Network, NR, Medium Access Control (MAC) Protocol Specification (Release 16)", 3GPP Standard, Technical Specification, 3rd Generation Partnership Project, Mobile Competence Centre, 650, Route Des Lucioles, F-06921 Sophia-Antipolis Cedex, France, vol. RAN WG2, No. V16.5.0, Jun. 2021, XP052030240, pp. 1-156, [Retrieved on Jul. 7, 2021], Section 6.1.3.25, p. 130-p. 131, Figures 6.1.3.25-1.

(Continued)

*Primary Examiner* — Otis L Thompson, Jr.
(74) *Attorney, Agent, or Firm* — Harrity & Harrity LLP/QUALCOMM Incorporated

(57) ABSTRACT

Various aspects of the present disclosure generally relate to wireless communication. In some aspects, a user equipment (UE) may receive a medium access control (MAC) control element (CE) that indicates an update to a spatial relation configuration of the UE for physical uplink control channel (PUCCH) transmissions. The update may apply to a first PUCCH resource and may apply to other PUCCH resources in a group of PUCCH resources to which the first PUCCH resource belongs based at least in part on a bit included in the update or an indication of which PUCCH resources are to be in the group of PUCCH resources. The UE may update the spatial relation configuration of the UE for the first PUCCH resource or for all PUCCH resources in the group of PUCCH resources. The UE may transmit a PUCCH (Continued)

MAC CE indicating update to spatial relation configuration of UE for single PUCCH resource or group of PUCCH resources communication on at least the first PUCCH resource. Numerous other aspects are described.

30 Claims, 10 Drawing Sheets

(56) References Cited

U.S. PATENT DOCUMENTS 12,356,344 B2* 7/2025 Jiang .................... H04W 52/54
2020/0053721 A1* 2/2020 Cheng .................... H04B 7/086
2020/0119778 A1* 4/2020 Grant .................... H04B 7/0695
2020/0177266 A1* 6/2020 Kang .................... H04L 5/0092
2020/0314829 A1* 10/2020 Venugopal ............ H04W 76/11
2020/0351069 A1* 11/2020 Grant .................... H04W 16/28
2021/0029650 A1* 1/2021 Cirik .................... H04W 52/146
2021/0067979 A1* 3/2021 Rahman ................ H04L 5/0053
2021/0105780 A1* 4/2021 Jin .................... H04L 5/0098
2021/0314953 A1* 10/2021 Park .................... H04W 80/02
2022/0045735 A1* 2/2022 Yang .................... H04L 5/005
2022/0053484 A1* 2/2022 You .................... H04L 5/0053
2022/0094510 A1* 3/2022 Zhang .................... H04L 5/0023
2022/0095330 A1* 3/2022 Kang .................... H04B 7/0408
2022/0109541 A1* 4/2022 Cirik .................... H04L 5/0023
2022/0123872 A1* 4/2022 Zhang .................... H04L 1/1861
2022/0191878 A1* 6/2022 Yu .................... H04L 5/0023
2022/0232482 A1* 7/2022 Matsumura ........... H04L 5/0048
2022/0248336 A1* 8/2022 Matsumura ........... H04W 52/10
2022/0271882 A1* 8/2022 Liu .................... H04B 7/0617
2022/0303966 A1* 9/2022 Deghel .................... H04W 72/23
2022/0312338 A1* 9/2022 Matsumura ......... H04W 52/146
2022/0330173 A1* 10/2022 Matsumura ........... H04L 5/0051
2022/0353038 A1* 11/2022 Khoshnevisan ..... H04B 7/0695
2022/0353892 A1* 11/2022 Cirik .................... H04L 5/0096
2022/0393840 A1* 12/2022 Määttanen .............. H04L 5/001
2022/0394701 A1* 12/2022 Zhang .................... H04L 5/0023
2023/0024375 A1* 1/2023 Yao .................... H04W 52/242
2023/0046074 A1* 2/2023 Zhang .................... H04W 72/04
2023/0053430 A1* 2/2023 Määttänen ........... H04B 7/0404
2023/0077264 A1* 3/2023 Gao .................... H04B 7/0408
2023/0147122 A1* 5/2023 Canonne-Velasquez .................... H04L 5/005 370/329
2023/0156485 A1* 5/2023 Zhang .................... H04W 16/28 370/329
2023/0164786 A1* 5/2023 Wang .................... H04L 5/0023 370/329
2023/0189250 A1* 6/2023 Go .................... H04L 5/14 370/329
2023/0189284 A1* 6/2023 Cheng .................... H04W 24/10 370/329
2023/0198719 A1* 6/2023 Wang .................... H04L 5/0048 370/329
2023/0209507 A1* 6/2023 Liu .................... H04W 72/23 370/329
2023/0209556 A1* 6/2023 Kang .................... H04L 5/0048 370/329
2023/0421233 A1* 12/2023 Li .................... H04L 5/0094
2024/0040564 A1* 2/2024 Cirik .................... H04W 16/28
2024/0373372 A1* 11/2024 Gao .................... H04W 72/21
2025/0105977 A1* 3/2025 Liu .................... H04L 5/0048

OTHER PUBLICATIONS

3GPP TS 38.331: "3rd Generation Partnership Project, Technical Specification Group Radio Access Network, NR, Radio Resource Control (RRC) Protocol Specification (Release 16)", 3GPP Standard, Technical Specification, 3rd Generation Partnership Project, Mobile Competence Centre, 650, Route Des Lucioles, F-06921 Sophia-Antipolis Cedex, France, Jul. 6, 2021, pp. 1-959, XP052030220, p. 448-p. 469.

International Search Report and Written Opinion—PCT/CN2021/110792—ISA/EPO—Feb. 10, 2022.

Nokia, et al., "Summary #1 of Multi-TRP PUCCH and PUSCH", 3GPP Draft, 3GPP TSF RAN WG1 #104-bis-e, R1-2103843, 3rd Generation Partnership Project (3GPP), Mobile Competence Centre, 650, Route Des Lucioles, F-06921 Sophia-Antipolis Cedex, France, vol. RAN WG1, No. e-Meeting; Apr. 12, 2021-Apr. 20, 2021 Apr. 12, 2021 (Apr. 12, 2021), XP051995272, 67 Pages, Sections 2.1-2.2, p. 1-p. 6.

ZTE: "Enhancements on Multi-TRP for PDCCH, PUCCH and PUSCH", 3GPP Draft, 3GPP TSG RAN WG1 Meeting #104-e, R1-2100286, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021 Jan. 19, 2021 (Jan. 19, 2021), XP051970901, 25 Pages, Sections 2.3.1-2.3.2, p. 21-p. 22, Figures 2.3-1.

* cited by examiner

300

MAC CE for 8 spatial relations

400

500

| | | | |
|---|---|---|---|
| R | | Serving Cell ID | BWP ID |
| R | PUCCH Resource ID | | |
| F | R | First Spatial Relation Info ID | |
| R | R | Second Spatial Relation Info ID | |
| ... | | | |

| | | | | |
|---|---|---|---|---|
| R | Serving Cell ID | | BWP ID | Oct 1 |
| R | PUCCH Resource ID | | | Oct 2 |
| R | R | Spatial Relation Info ID | | Oct 3 |
| R | PUCCH Resource ID | | | Oct 4 |
| R | R | Spatial Relation Info ID | | Oct 5 |
| ... | | | | |

Enhanced MAC CEs including spatial relation information IDs for multiple PUCCH resources

MEDIUM ACCESS CONTROL CONTROL ELEMENT FOR UPDATE OF SPATIAL RELATION CONFIGURATION

CROSS-REFERENCE TO RELATED APPLICATION

This Patent Application is a 371 national stage of PCT Application No. PCT/CN2021/110792, filed on Aug. 5, 2021, entitled "MEDIUM ACCESS CONTROL CONTROL ELEMENT FOR UPDATE OF SPATIAL RELATION CONFIGURATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for updating a spatial relation configuration with a medium access control control element (MAC CE).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a medium access control (MAC) control element (CE) that indicates an update to a spatial relation configuration of the UE for physical uplink control channel (PUCCH) transmissions. The update may identify a first PUCCH resource to which the update applies and may identify first spatial relation information associated with first spatial settings and first power control parameters. The update may further apply to other PUCCH resources in a group of PUCCH resources to which the first PUCCH resource belongs based at least in part on a bit included in the update or an indication of which PUCCH resources are to be in the group of PUCCH resources for the update. The method may include updating, using the first spatial relation information, the spatial relation configuration of the UE for any combination of the first PUCCH resource or the other PUCCH resources in the group of PUCCH resources. The method may include transmitting a PUCCH communication on at least the first PUCCH resource.

Some aspects described herein relate to a method of wireless communication performed by a base station. The method may include generating a MAC CE that indicates an update to a spatial relation configuration of a UE for PUCCH transmissions. The update may identify a first PUCCH resource to which the update applies and may identify first spatial relation information associated with first spatial settings and first power control parameters. The update may further indicate whether the update applies to other PUCCH resources in a group of PUCCH resources to which the first PUCCH resource belongs based at least in part on a bit included in the update or an indication of which PUCCH resources are to be in the group of PUCCH resources for the update. The method may include transmitting the MAC CE to the UE.

Some aspects described herein relate to a UE for wireless communication. The UE may include a memory and one or more processors coupled to the memory. The one or more processors may be configured to receive a MAC CE that indicates an update to a spatial relation configuration of the UE for PUCCH transmissions. The update may identify a first PUCCH resource to which the update applies and may identify first spatial relation information associated with first spatial settings and first power control parameters. The update may further apply to other PUCCH resources in a group of PUCCH resources to which the first PUCCH resource belongs based at least in part on a bit included in the update or an indication of which PUCCH resources are to be in the group of PUCCH resources for the update. The one or more processors may be configured to update, using the first spatial relation information, the spatial relation configuration of the UE for any combination of the first PUCCH resource or the other PUCCH resources in the group of PUCCH resources. The one or more processors may be configured to transmit a PUCCH communication on at least the first PUCCH resource.

Some aspects described herein relate to a base station for wireless communication. The base station may include a memory and one or more processors coupled to the memory. The one or more processors may be configured to generate a MAC CE that indicates an update to a spatial relation configuration of a UE for PUCCH transmissions. The update may identify a first PUCCH resource to which the update applies and may identify first spatial relation information associated with first spatial settings and first power control parameters. The update may further indicate whether the update applies to other PUCCH resources in a group of PUCCH resources to which the first PUCCH resource belongs based at least in part on a bit included in the update or an indication of which PUCCH resources are to be in the group of PUCCH resources for the update. The one or more processors may be configured to transmit the MAC CE to the UE.

Some aspects described herein relate to a non-transitory computer-readable medium that stores a set of instructions for wireless communication by a UE. The set of instructions, when executed by one or more processors of the UE, may cause the UE to receive a MAC CE that indicates an update to a spatial relation configuration of the UE for PUCCH transmissions. The update may identify a first PUCCH resource to which the update applies and may identify first spatial relation information associated with first spatial settings and first power control parameters. The update may further apply to other PUCCH resources in a group of PUCCH resources to which the first PUCCH resource belongs based at least in part on a bit included in the update or an indication of which PUCCH resources are to be in the group of PUCCH resources for the update. The set of instructions, when executed by one or more processors of the UE, may cause the UE to update, using the first spatial relation information, the spatial relation configuration of the UE for any combination of the first PUCCH resource or the other PUCCH resources in the group of PUCCH resources. The set of instructions, when executed by one or more processors of the UE, may cause the UE to transmit a PUCCH communication on at least the first PUCCH resource.

Some aspects described herein relate to a non-transitory computer-readable medium that stores a set of instructions for wireless communication by a base station. The set of instructions, when executed by one or more processors of the base station, may cause the base station to generate a MAC CE that indicates an update to a spatial relation configuration of a UE for PUCCH transmissions. The update may identify a first PUCCH resource to which the update applies and may identify first spatial relation information associated with first spatial settings and first power control parameters. The update may further indicate whether the update applies to other PUCCH resources in a group of PUCCH resources to which the first PUCCH resource belongs based at least in part on a bit included in the update or an indication of which PUCCH resources are to be in the group of PUCCH resources for the update. The set of instructions, when executed by one or more processors of the base station, may cause the base station to transmit the MAC CE to the UE.

Some aspects described herein relate to an apparatus for wireless communication. The apparatus may include means for receiving a MAC CE that indicates an update to a spatial relation configuration of the apparatus for PUCCH transmissions. The update may identify a first PUCCH resource to which the update applies and may identify first spatial relation information associated with first spatial settings and first power control parameters. The update may further apply to other PUCCH resources in a group of PUCCH resources to which the first PUCCH resource belongs based at least in part on a bit included in the update or an indication of which PUCCH resources are to be in the group of PUCCH resources for the update. The apparatus may include means for update, using the first spatial relation information, the spatial relation configuration of the apparatus for any combination of the first PUCCH resource or the other PUCCH resources in the group of PUCCH resources. The apparatus may include means for transmitting a PUCCH communication on at least the first PUCCH resource.

Some aspects described herein relate to an apparatus for wireless communication. The apparatus may include means for generating a MAC CE that indicates an update to a spatial relation configuration of a UE for PUCCH transmissions. The update may identify a first PUCCH resource to which the update applies and may identify first spatial relation information associated with first spatial settings and first power control parameters. The update may further indicate whether the update applies to other PUCCH resources in a group of PUCCH resources to which the first PUCCH resource belongs based at least in part on a bit included in the update or an indication of which PUCCH resources are to be in the group of PUCCH resources for the update. The apparatus may include means for transmitting the MAC CE to the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of enhanced MAC CEs for 64 candidate spatial relation settings, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
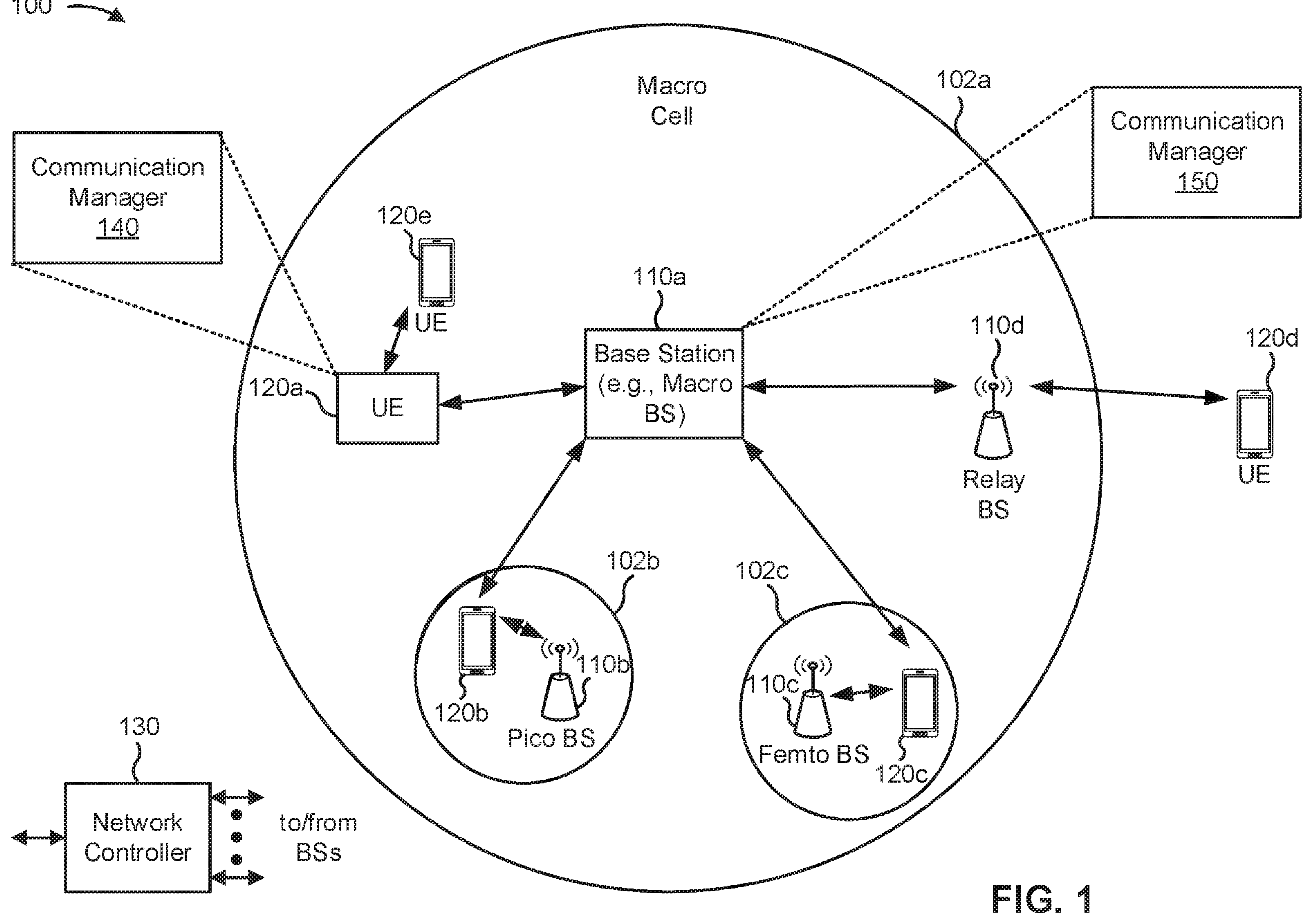
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown)

in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS **110*d* (e.g., a relay base station) may communicate with the BS 110*a* (e.g., a macro base station) and the UE 120*d* in order to facilitate communication between the BS 110*a* and the UE 120*d*. A base station 110** that relays communications may be referred to as a relay station, a relay base station, a relay, or the like.

The wireless network 100 may be a heterogeneous network that includes base stations 110 of different types, such as macro base stations, pico base stations, femto base stations, and/or relay base stations. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE **120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110**.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). A UE using FR1 may be equipped with a small number of antenna elements distributed around the device, while a UE using FR2 may be equipped with highly integrated antenna panels for beamforming. It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a medium access control (MAC) control element (CE) that indicates an update to a spatial relation configuration of the UE for physical uplink control channel (PUCCH) transmissions. The update may identify a first PUCCH resource to which the update applies and identify first spatial relation information associated with first spatial settings and first power control parameters. The update may further apply to other PUCCH resources in a group of PUCCH resources to which the first PUCCH resource belongs based at least in part on a bit included in the update or an indication of which PUCCH resources are to be in the group of PUCCH resources for the update. The communication manager 140 may update, using the first spatial relation information, the spatial relation configuration of the UE for any combination of the first PUCCH resource or the other PUCCH resources in the group of PUCCH resources. In other words, the update may apply to the first PUCCH resource or to the multiple (e.g., all) PUCCH resources in the group of PUCCH resources. The communication manager 140 may transmit a PUCCH communication on at least the first PUCCH resource. This may include transmission on other PUCCH resources in the group of PUCCH resources. Additionally, or alternatively, the communication manager 140 may perform one or more other operations described herein.

In some aspects, the base station 110 may include a communication manager 150. As described in more detail elsewhere herein, the communication manager 150 may generate a MAC CE that indicates an update to a spatial relation configuration of a UE for PUCCH transmissions. The update may identify a first PUCCH resource to which the update applies and identify first spatial relation information associated with first spatial settings and first power control parameters, and the update may indicate whether the update applies to other PUCCH resources in a group of PUCCH resources to which the first PUCCH resource belongs based at least in part on a bit included in the update or prior transmission of an indication of which PUCCH resources are to be in the group of PUCCH resources for the update. The communication manager 150 may transmit the MAC CE to the UE. Additionally, or alternatively, the communication manager 150 may perform one or more other operations described herein.

As indicated above, FIG. 1 is provided as an example. Other examples may differ from what is described with regard to FIG. 1.

Figure 2:
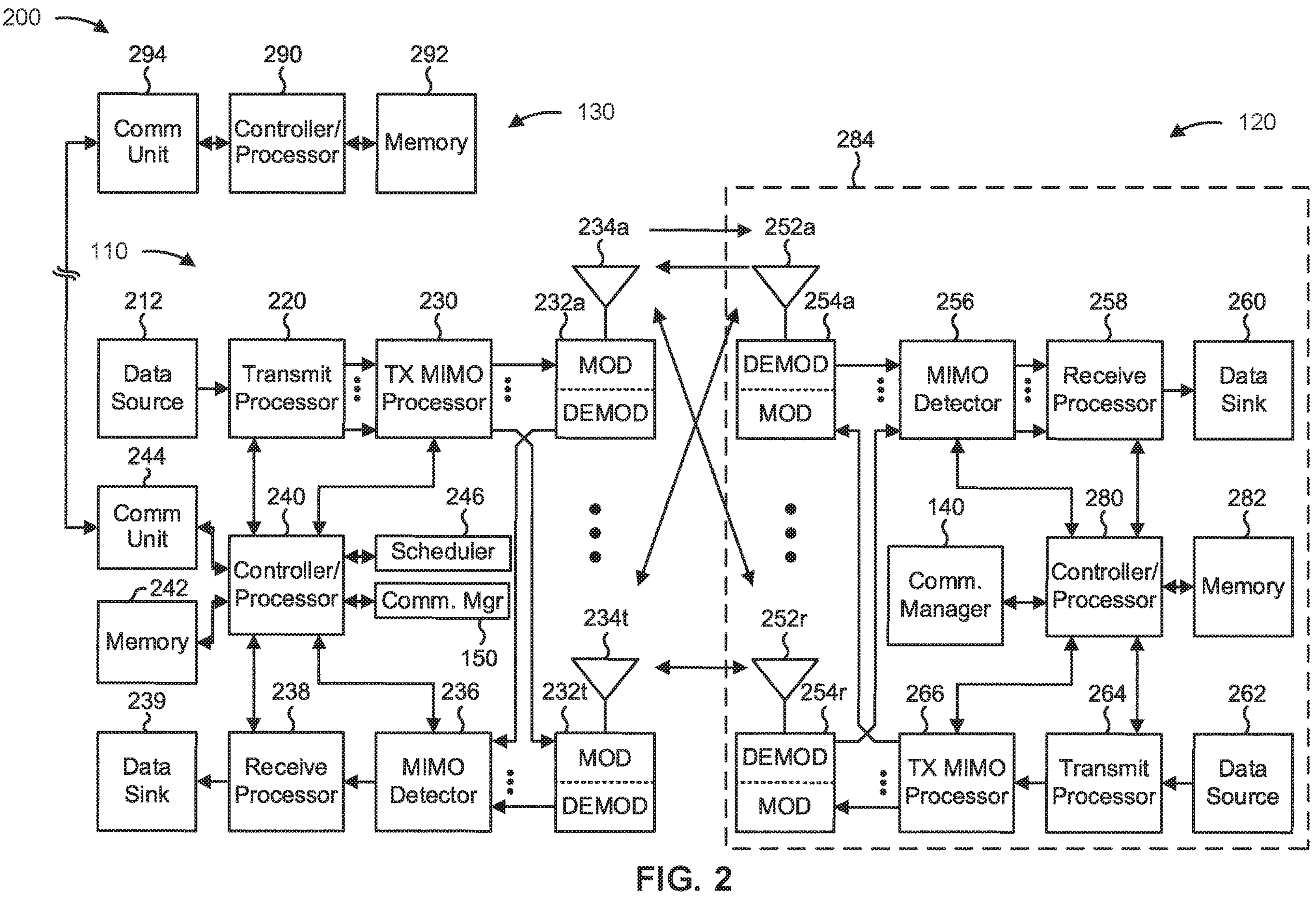
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with updating a spatial relation configuration of a UE with a MAC CE, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving a MAC CE that indicates an update to a spatial relation configuration of the UE for PUCCH transmissions (e.g., using antenna 252, modem 254, MIMO detector 256, receive processor 258, controller/processor 280, memory 282), where the update identifies a first PUCCH resource to which the update applies and identifies first spatial relation information associated with first spatial settings and first power control parameters, and where the update further applies to other PUCCH resources in a group of PUCCH resources to which the first PUCCH resource belongs based at least in part on a bit included in the update or an indication of which PUCCH resources are to be in the group of PUCCH resources for the update; means for updating, using the first spatial relation information, the spatial relation configuration of the UE for any combination of the first PUCCH resource or the other PUCCH resources in the group of PUCCH resources (e.g., using controller/processor 280, transmit processor 264, TX MIMO processor 266, modem 254, antenna 252, memory 282); and/or means for transmitting a PUCCH communication on at least the first PUCCH resource (e.g., using controller/processor 280, transmit processor 264, TX MIMO processor 266, modem 254, antenna 252, memory 282). The means for the UE 120 to perform operations described herein may include, for example, one or more of communication manager 140, antenna 252, modem 254, MIMO detector 256, receive processor 258, transmit processor 264. TX MIMO processor 266, controller/processor 280, or memory 282.

In some aspects, the base station 110 includes means for generating a MAC CE that indicates an update to a spatial relation configuration of a UE for PUCCH transmissions (e.g., using controller/processor 240, memory 242), where the update identifies a first PUCCH resource to which the update applies and identifies first spatial relation information associated with first spatial settings and first power control parameters, and where the update indicates whether the update applies to other PUCCH resources in a group of PUCCH resources to which the first PUCCH resource belongs based at least in part on a bit included in the update or prior transmission of an indication of which PUCCH resources are to be in the group of PUCCH resources for the update; and/or means for transmitting the MAC CE to the UE (e.g., using controller/processor 240, transmit processor 220, TX MIMO processor 230, modem 232, antenna 234, memory 242). The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above. FIG. 2 is provided as an example. Other examples may differ from what is described with regard to FIG. 2.

Figure 3:
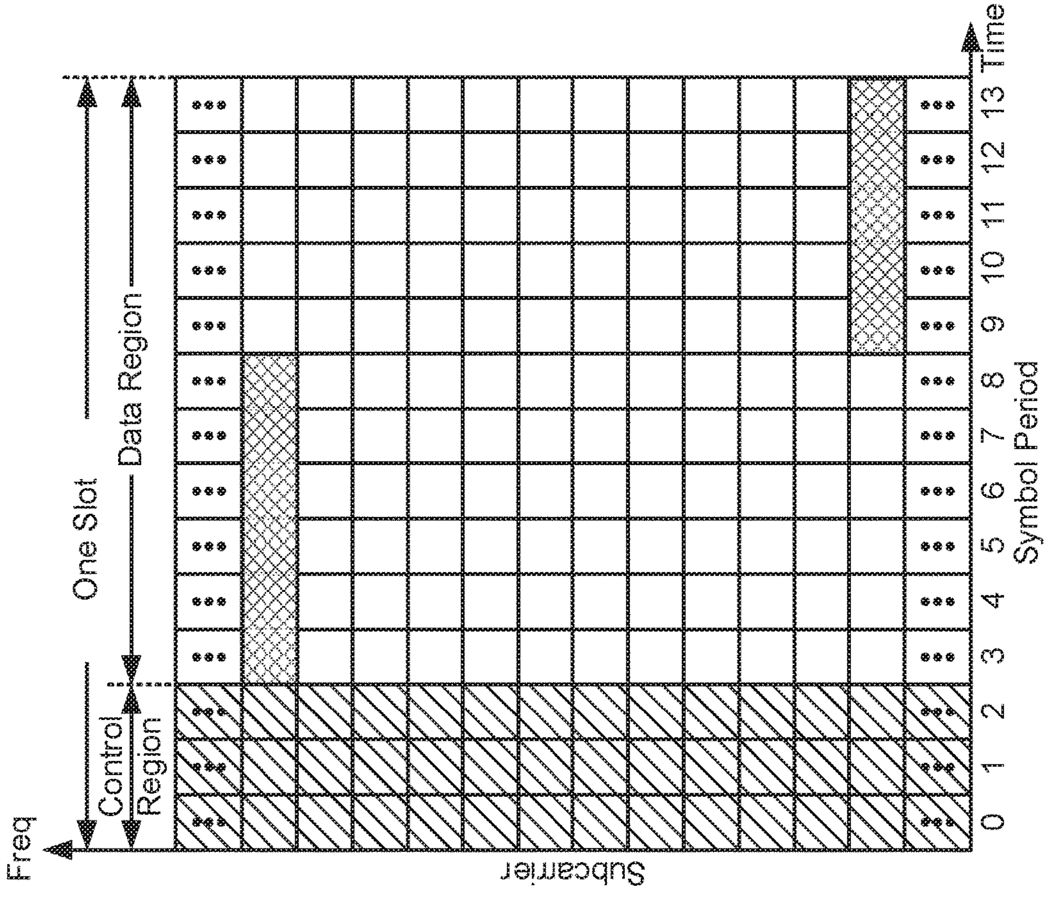
FIG. 3 is a diagram illustrating an example slot format with a physical uplink control channel (PUCCH), in accordance with the present disclosure.
Figure 3:
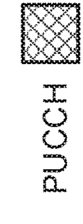

FIG. 3 is a diagram illustrating an example slot format 300 with a PUCCH, in accordance with the present disclosure. Available time frequency resources may be partitioned into resource blocks (RBs). Each RB may cover a set of subcarriers (e.g., 12 subcarriers) in one slot and may include a number of resource elements (REs). Each RE may cover one subcarrier in one symbol period (e.g., in time) and may be used to send one modulation symbol, which may be a real or complex value. In each RB, some of the REs may be used for PUCCH transmissions, as shown in FIG. 3.

The PUCCH transmissions may transmitted according to a spatial relation configuration. A spatial relation configuration may include a particular combination of one or more spatial settings, one or more power control parameters, and/or a codebook. A spatial setting may include one or more reference signals to define a transmission beam that a UE may use for PUCCH transmissions. Beamforming may be achieved using an antenna array by combining antenna elements in the antenna array such that signals at particular angles experience constructive interference while signals at other angles experience destructive interference. A base station and a UE may communicate using mmWave beams. Power control parameters may include a power output and/or path loss reference signals.

A base station may configure (or rather preconfigure) a UE with a spatial relation configuration via radio resource control (RRC) signaling. The base station may use an information element (IE) such as PUCCH-SpatialRelationInfo to configure spatial settings and power control parameters for PUCCH resources. The IE PUCCH-SpatialRelationInfo may include a spatial relation information identifier (ID) (PUCCH-SpatialRelationInfoId), a serving cell ID (servingCellId), and a reference signal that determines an uplink beam (spatial settings) with a synchronization signal block (SSB) index (ssb-Index), a channel state information reference signal (CSI-RS) index (csi-RS-Index), and/or a sounding reference signal (SRS) (srs). The base station may use RRC signaling to configure up to 8 spatial relation information IDs (in 3GPP Release 15 of the relevant standards) or up to 64 spatial relation information IDs (in Release 16) for all PUCCH resources (i.e., not per PUCCH resource). The UE may, in turn, transmit a PUCCH communication using a spatial domain filter that is based at least in part on the spatial relation configuration. For example, the UE may transmit the PUCCH communication using the same spatial domain filter that is used for reception of an SSB indicated by ssb-Index, reception of an CSI-RS indicated by csi-RS-Index, or transmission of an SRS indicated by srs.

The base station may later transmit a MAC CE with spatial relation information to update the spatial relation configuration of the UE. The UE may use the spatial relation information in the MAC CE to activate or deactivate a spatial relation setting of the spatial relation configuration of the UE. For example, the MAC CE may activate one of the 8 (or one of the 64) spatial relation information IDs for a given PUCCH resource. Each PUCCH resource may be associated with one spatial relation information and one set of power control parameters. In Release 17, a MAC CE may activate up to two spatial relation information IDs per PUCCH resource.

The IE PUCCH-SpatialRelationInfo may also include power control parameters, such as a pathloss reference signal (PLRS) indicated by pucch-PathlossReferenceRS-Id (e.g., via an ssb-Index or csi-RS-Index), a power parameter P0 indicated by P0-PUCCH-Id, and a closed loop index indicated by closedLoopIndex. The P0-PUCCH-Id may indicate a p0-PUCCH-Value. Each PUCCH resource may be associated with one set of power control parameters.

As indicated above, FIG. 3 is provided as an example. Other examples may differ from what is described with regard to FIG. 3.

Figure 4:
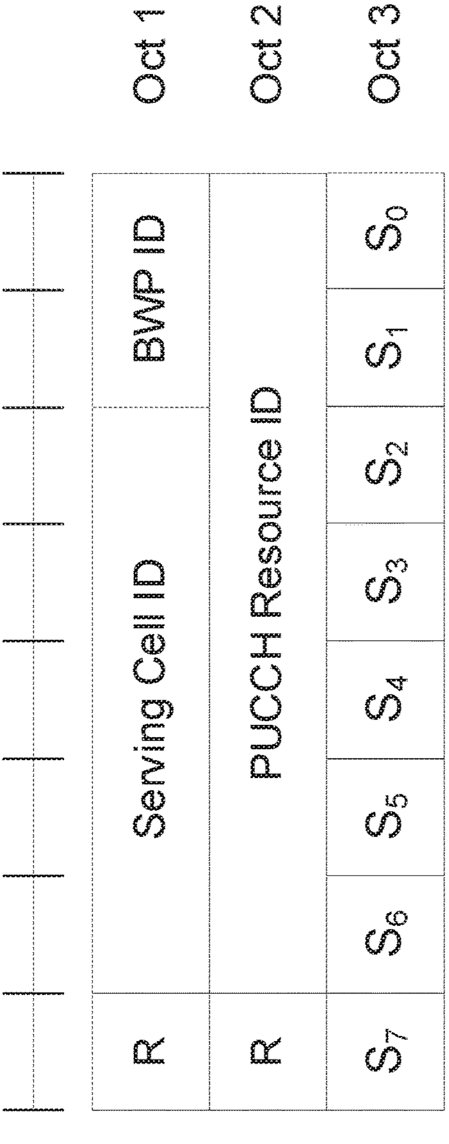
FIG. 4 is a diagram illustrating an example of a conventional medium access control control element (MAC CE) for 8 candidate spatial relation settings, in accordance with the present disclosure.

FIG. 4 is a diagram illustrating an example 400 of a conventional MAC CE for 8 candidate spatial relation settings, in accordance with the present disclosure. The MAC CE is used to update a spatial relation configuration of a UE for PUCCH transmissions. The MAC CE includes a structure that is organized into multiple octets of bits (8 bits). The MAC CE may include a serving cell ID, a bandwidth part (BWP) ID, a PUCCH resource ID, and spatial relation information. The serving cell ID may be 5 bits and may identify a serving cell for which the MAC CE applies. The BWP ID may be 2 bits and may indicate an uplink BWP for which the MAC CE applies. The PUCCH resource ID may be 7 bits and may identify a PUCCH resource out of 128 possible PUCCH resources. "R" fields are reserve bits set to "0". The MAC CE also includes an array of bits, designated as $S_0$ to $S_7$, to identity a spatial relation setting. In this MAC CE, there are 8 candidate spatial relation settings. An "$S_i$" bit set to "1" will activate the spatial relation setting. An "$S_i$" bit set to "0" will deactivate the spatial relation setting.

For example, the base station may have preconfigured the UE to store a particular combination of spatial settings (e.g., reference signal) and power control parameters for spatial relation configuration $S_6$. This particular spatial relation configuration may differ from other candidate spatial relation configurations corresponding to $S_0$-$S_5$ and $S_7$. Accordingly, when the UE receives the MAC CE and determines that a bit $S_6$ is set to "1" and bits $S_0$-$S_5$ and $S_7$ are set to "0", UE 120 may determine, from stored information, a particular spatial relation configuration corresponding to $S_6$. UE 120 may update the spatial relation configuration of the UE based at least in part on the particular spatial relation configuration stored for $S_6$.

As indicated above. FIG. 4 is provided as an example. Other examples may differ from what is described with regard to FIG. 4.

FIG. 5 is a diagram illustrating an example 500 of enhanced MAC CEs for 64 candidate spatial relation settings, in accordance with the present disclosure. The enhanced MAC CE extends the quantity of candidate spatial relation settings from 8 to 64. The conventional MAC CE does not include an explicit spatial relation information ID to identify a particular spatial relation configuration. By contrast, the enhanced MAC CE does include an explicit spatial relation information ID. For example, the enhanced MAC CE may include a first PUCCH resource ID and a corresponding first spatial relation information ID. The enhanced MAC CE may also include a second PUCCH resource ID and a corresponding second spatial relation information ID. That is, with the enhanced MAC CE, the base station may update two spatial settings and two sets of power control parameters of the spatial relation configuration of the UE for different PUCCH resources. Additionally, or alternatively, the enhanced MAC CE may include more than two PUCCH resource IDs with corresponding spatial relation information for each PUCCH resource ID. Because spatial relation information may be indicated with explicit spatial relation information IDs, the base station may generate information for many PUCCH resources in a single MAC CE. An enhanced MAC CE may also indicate spatial relation information for a PUCCH resource with a bitmap of 64 bits ($S_0$-$S_{63}$).

The base station may use RRC signaling to configure spatial relation information for a group of PUCCH resources (e.g., via PUCCH-ResourceGroup-r16). The IE PUCCH-ResourceGroup-r16 may include a PUCCH group ID (PUCCH-ResourceGroupId-r16) and a list of PUCCH resources (e.g., up to 16 indicated by resourcePerGroupList-r16). The base station may use a MAC CE to update (and effectively activate or deactivate) the group of PUCCH resources. The update of one PUCCH resource in the group of PUCCH resources indicates that all PUCCH resources in the group of PUCCH resources are to be updated.

In some aspects, the enhanced MAC CE may include a conditional bit ("F") that indicates whether the second spatial relation information ID is present for a second PUCCH resource ID. For example, a "1" bit may indicate that the second spatial relation information is present, and a "0" bit may indicate that the second spatial relation information is not present, and UE 120 may stop reading bits for PUCCH resource ID portion of the MAC CE.

A MAC subheader is part of the MAC protocol data unit (PDU) structure for the MAC layer used by MAC CEs. The MAC subheader for a downlink shared channel (DL-SCH) or an uplink shared channel (UL-SCH) may include multiple fields, including a logical channel ID (LCID) that identifies a logical channel instance of a corresponding MAC service data unit (SDU), identifies a type of a corresponding MAC CE, and/or includes padding for the DL-SCH or UL-SCH. The subheader may also include an extended LCID (eLCID) field that identifies the logical channel instance of the corresponding MAC SDU or the type of the corresponding MAC CE. There is one LCID field per MAC subheader, and the LCID field size is 6 bits. The size of the eLCID field is either 8 bits or 16 bits. If the LCID field is set to 34, one additional octet is present in the MAC subheader containing the eLCID field that follows the octet containing LCID field. If the LCID field is set to 33, two additional octets are present in the MAC subheader containing the eLCID field and these two additional octets follow the octet containing the LCID field. The LCID (for a Release 15 MAC CE) and the eLCID (for a Release 16 MAC CE) are used to identify MAC CEs in a MAC header.

As indicated above, FIG. 5 is provided as an example. Other examples may differ from what is described with respect to FIG. 5.

Figure 6:
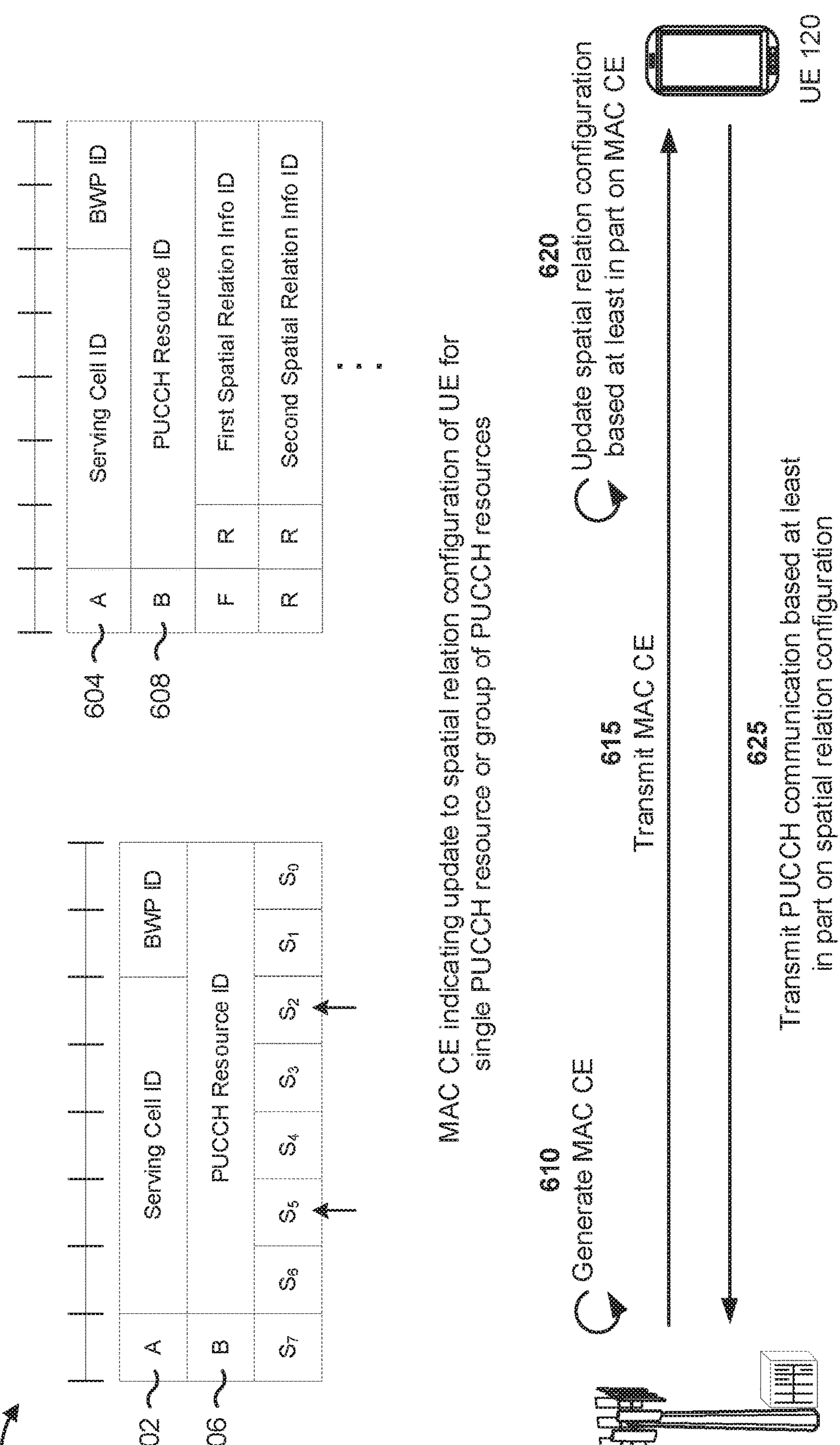
FIG. 6 is a diagram illustrating an example of a base station updating, with a MAC CE, a spatial relation configuration of a UE for PUCCH transmissions, in accordance with the present disclosure.

FIG. 6 is a diagram illustrating an example 600 of a base station updating, with a MAC CE, a spatial relation configuration of a UE for PUCCH transmissions, in accordance with the present disclosure. As shown in FIG. 6, a base station (e.g., base station 110) and a UE (e.g., UE 120) may communicate with one another. Example 600 shows two types of MAC CEs for updating multiple spatial relation settings and multiple sets of power control parameters in FR2 (e.g., by bitmap or by spatial relation information IDs). Note that FR1 and FR2 may include the frequencies described in connection with FIG. 1 or whatever range of frequencies is defined for FR1 and FR2 in standards promulgated by the 3GPP.

Up to two spatial relation information IDs can be activated per PUCCH resource via a MAC CE. This may enable the UE to transmit the same uplink control information (UCI) to different TRPs for enhanced reliability. The UE may support multiple TRP (mTRP) inter-slot repetition, where one PUCCH resource carries UCI and the same PUCCH resource carries a repetition of the UCI in another slot. The UE may also support mTRP intra-slot beam hopping, where UCI is transmitted in one PUCCH resource in which different sets of symbols within the PUCCH resource have different beams. The UE may support mTRP intra-slot repetition, where one PUCCH resource carries UCI and the same PUCCH resource carries a repetition of the UCI in one or more other sub-slots within the slot.

In FR2, the transmissions can have different beams (spatial relations) and different transmit powers. In FR1, the transmissions can have different transmit powers, but the beam (spatial relation information) is not defined. Consequently, activation of two spatial relation information IDs via a MAC CE applies to FR2, because there is no spatial relation information for FR1 (just power control parameters).

According to various aspects described herein, a base station may use a MAC CE (e.g., enhanced MAC CE) that is originally intended for FR2 to update power control parameters in FR1. The MAC CE for FR2 indicates both spatial settings and power control parameters and thus the UE, when updating power control parameters for FR1, may ignore or refrain from using the spatial settings in the MAC CE. That is, for a single TRP (sTRP) PUCCH, the base station may use the MAC CE to activate, deactivate, or update a set of power control parameters (in FR1) of the UE spatial relation configuration for an identified PUCCH resource (PUCCH resource ID) or for all PUCCH resources in a PUCCH resource group to which the identified PUCCH resource belongs. The UE may reuse the power control parameters (e.g., pucch-PathlossReferenceRS-Id, pucch-PathlossReferenceRS-Id. P0-PUCCH-Id) associated with a PUCCH-SpatialRelationInfoId identified in the MAC CE for FR2 and not use the spatial settings (referenceSignal) associated with the PUCCH-SpatialRelationInfoId. By using the existing (enhanced) MAC CE structure that is designed for FR2 (for updating spatial relations) for updating transmit power control parameters for FR1 (where spatial relations are not updated), the base station 110 and the UE 120 may conserve processing resources and signaling resources that would otherwise be consumed for additional MAC CE structure complexity (e.g., having to process separate MAC CE for FR1 transmit control parameters). Furthermore, by indicating whether the MAC CE applies to a single PUCCH resource or to a whole group of PUCCH resources, the base station 110 and the UE 120 may conserve processing resources and signaling resources by not sending multiple MAC CEs or by not updating more PUCCH resources than necessary.

Note that an update in a MAC CE may also be considered an activation and/or a deactivation of spatial settings and/or power control parameters, because identified spatial relation information may be effectively activated and non-identified spatial relation information may be effectively deactivated. Accordingly, updating (or the update) as described for example 600, may also refer to activating or deactivating. In some aspects, the update may be separate from activation and deactivation, and the MAC CE may include an indication (e.g., bit) of activation or deactivation.

As shown in example 600, a MAC CE may include a structure that is organized, for example, into multiple octets (8 bits). The MAC CE may include a serving cell ID, a BWP ID, and a PUCCH resource ID. The PUCCH resource ID may be 1 to 7 bits to indicate any one of up to (or more than) 128 PUCCH resources. In some aspects, the MAC CE may indicate (e.g., via a bit, such as bit 602 or bit 604) whether the MAC CE is to update a set of power control parameters of the UE spatial relation configuration (for FR1) for a single PUCCH resource or for a whole group of PUCCH resources (simultaneously with the single MAC CE). The update in the MAC CE may also identify the spatial relation information for the PUCCH resource by a bitmap or by a spatial relation information ID. The update may also identity other spatial relation information for updating other PUCCH resources in the group of PUCCH resources. Each PUCCH resource in the group of PUCCH resources may correspond to a spatial relation information. The MAC CE may also include another indication (e.g., via bit 606 or bit 608) of whether the update in the MAC CE for FR1 is for a normal uplink (NUL) carrier or a supplementary uplink (SUL) carrier. For example, if the corresponding bit in the MAC CE is set to "1", the update applies to the SUL carrier configuration. If the bit is set to "0", the update applies to the NUL carrier configuration. While bits 602, 604, 606, and 608 in example 600 are shown in certain locations that previously included reserve ("R") bits, bits 602, 604, 606, and 608 may be included in one or more other bit or field locations. Bits 602 and 604 may also indicate whether a MAC CE is to update spatial settings of the UE spatial relation configuration (for FR2) for the single PUCCH resource or for the whole group of PUCCH resources.

For mTRP PUCCH, the MAC CE may update two sets of power control parameters (for FR1) and/or two spatial settings (for FR2) for the identified PUCCH resource or for the group of PUCCH resources. The update in the MAC CE may identify a first spatial relation information and a second spatial relation information for the PUCCH resource. The update may also identify other spatial relation information for the other PUCCH resources in the group of PUCCH resources.

Alternatively, or additionally, the base station 110 may not use one of the reserve bits to indicate whether the single PUCCH resource or the whole group of PUCCH resources is to be updated. Rather, the base station 110 may indicate, by RRC signaling or another prior message, which PUCCH resources are to be in the group of PUCCH resources such that when the UE receives the MAC CE, the update in the MAC CE may apply to the whole group of PUCCH resources. Note that the group of PUCCH resources may include multiple PUCCH resources, but in this example involving prior signaling of the PUCCH resource for the group of PUCCH resources, the group of PUCCH resources may include a single PUCCH resource at times to reduce complexity (if only one PUCCH resource is intended). That is, the base station 110 may ensure, by prior signaling, that the PUCCH resource group contains only the intended PUCCH resources before sending the MAC CE to the UE 120.

As shown by reference number 610, the base station 110 may generate the MAC CE, including one of the MAC CEs shown in example 600. If the quantity of configured spatial relation information is less than or equal to 8, the base station 110 may use the left MAC CE structure in example 600 (or similar), and if the quantity of configured spatial relation information is greater than 8, the base station 110 may use the right MAC CE structure in example 600. The base station 110 may generate the MAC CE based at least in part on information about a transmission path on the PUCCH for the UE 120, traffic conditions or a UE capability indicated by the UE 120. For example, the base station 110 may select the spatial relation information and/or the PUCCH resources to update based at least in part on reference signal measurements for PUCCH from the UE 120. As shown by reference number 615, the base station 110 may transmit the MAC CE to the UE 120.

As shown by reference number 620, the UE 120 may update a spatial relation configuration of the UE 120 based at least in part on the MAC CE. For example, the UE 120 may update power control parameters (for FR1) for a group of PUCCH resources using identification information in the MAC CE for a PUCCH resource in the group of PUCCH resources, a bit indicating that the group of PUCCH resources is to be updated, and spatial relation information (spatial relation information IDs) for each of the PUCCH resources. In an mTRP scenario, there may be two spatial relation information IDs for each PUCCH resource or for each PUCCH resource in the group of PUCCH resources.

In some scenarios, the UE 120 may be operating in carrier aggregation with a first carrier to a first TRP and a second carrier to a second TRP. The first carrier may be operating in FR1 and the second carrier may be operating in FR2. The UE 120 may receive a MAC CE, such as shown in example 600, on the first carrier for updating power control parameters (for FR1). If the UE 120 receives the MAC CE on the second carrier that is operating in FR2, but the MAC CE is intended to only update power control parameters for transmission on FR1, the UE 120 may be unable to determine a specific purpose of the MAC CE. In some aspects, the base station 110 may assign the MAC CE an LCID or eLCID that the UE 120 may use to distinguish between updating a set of power control parameters (for FR1) or also updating spatial settings (for FR2). For example, the base station 110 may configure the UE 120 to determine that the MAC CE includes an update for FR1 transmission if the LCID or eLCID in the MACE CE is in a first range of LCIDs or eLCIDs and determine that the update is for FR2 if the LCID or eLCID is in a second range of LCIDs or eLCIDs (e.g., non-overlapping with the first range). In some aspects, the base station 110 may use another bit in the MAC CE (e.g., bit 606 or bit 608) to help the UE 120 to distinguish whether the MAC CE is to update power control parameters (for FR1) or to also update spatial settings (for FR2).

As shown by reference number 625, the UE 120 may transmit a PUCCH communication to the base station 110 based at least in part on the updated spatial relation configuration of the UE 120. In sum, by providing additional indications in the existing MAC CE structure, the base station 110 may efficiently update the UE spatial relation configuration, whether for FR1 or FR2 and whether for a single PUCCH resource or a group of PUCCH resources.

As indicated above, FIG. 6 is provided as an example. Other examples may differ from what is described with respect to FIG. 6.

Figure 7:
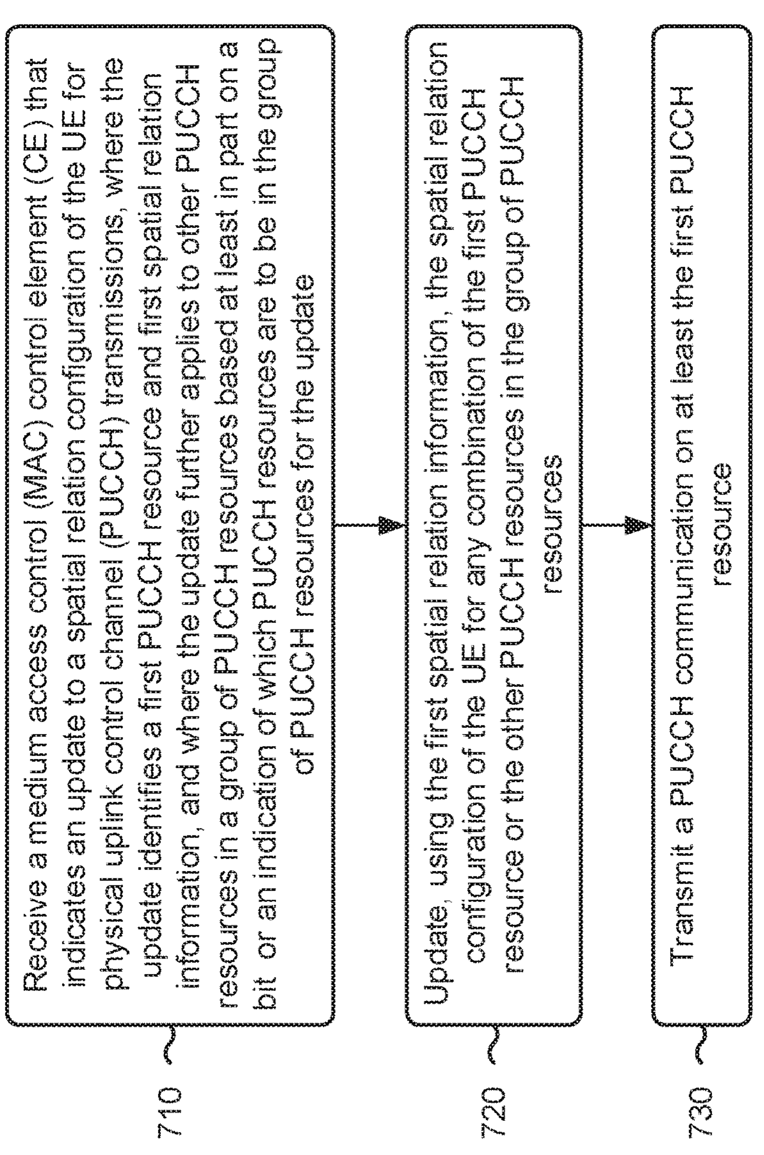
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with updating a spatial relation configuration with a MAC CE.

As shown in FIG. 7, in some aspects, process 700 may include receiving a MAC CE that indicates an update to a spatial relation configuration of the UE for PUCCH transmissions (block 710). For example, the UE (e.g., using communication manager 140 and/or reception component 902 depicted in FIG. 9) may receive a MAC CE that indicates an update to a spatial relation configuration of the UE for PUCCH transmissions, as described above, for example, with reference to 3, 4, 5, and/or 6. In some aspects, the update identifies a first PUCCH resource to which the update applies and identifies first spatial relation information associated with first spatial settings and first power control parameters. In some aspects, the update further applies to other PUCCH resources in a group of PUCCH resources to which the first PUCCH resource belongs based at least in part on a bit included in the update or an indication of which PUCCH resources are to be in the group of PUCCH resources for the update.

As further shown in FIG. 7, in some aspects, process 700 may include updating, using the first spatial relation information, the spatial relation configuration of the UE for any combination of the first PUCCH resource or the other PUCCH resources in the group of PUCCH resources (block 720). For example, the UE (e.g., using communication manager 140 and/or updating component 908 depicted in FIG. 9) may update, using the first spatial relation information, the spatial relation configuration of the UE for any combination of the first PUCCH resource or the other PUCCH resources in the group of PUCCH resources, as described above, for example, with reference to 3, 4, 5, and/or 6.

As further shown in FIG. 7, in some aspects, process 700 may include transmitting a PUCCH communication on at least the first PUCCH resource (block 730). For example, the UE (e.g., using communication manager 140 and/or transmission component 904 depicted in FIG. 9) may transmit a PUCCH communication on at least the first PUCCH resource, as described above, for example, with reference to 3, 4, 5, and/or 6.

Process 700 may include additional aspects, such as any single aspect or any combination of aspects described below and/or in connection with one or more other processes described elsewhere herein.

In a first aspect, updating the spatial relation configuration of the UE includes updating a first set of power control parameters of the spatial relation configuration of the UE for transmission in FR1 using the first power control parameters of the first spatial relation information and refraining from using the first spatial settings of the first spatial relation information.

In a second aspect, alone or in combination with the first aspect, the update identifies second spatial relation information associated with second spatial settings and second power control parameters, and updating the spatial relation configuration of the UE includes updating a second set of power control parameters of the spatial relation configuration using the second power control parameters of the second spatial relation information and refraining from using the second spatial settings of the second spatial relation information.

In a third aspect, alone or in combination with one or more of the first and second aspects, updating the spatial relation configuration of the UE for transmission in FR1 includes updating the spatial relation configuration for an NUL or for an SUL carrier based at least in part on a bit in the MAC CE.

In a fourth aspect, alone or in combination with one or more of the first through third aspects, the UE is operating using carrier aggregation, and process 700 includes determining whether the update applies to transmission in FR1 or transmission in FR2 based at least in part on an LCID in the MAC CE. The LCID may include an eLCID.

In a fifth aspect, alone or in combination with one or more of the first through fourth aspects, the UE is operating using carrier aggregation, and process 700 includes determining whether the update applies to transmission in FR1 or transmission in FR2 based at least in part on a bit in the MAC CE.

In a sixth aspect, alone or in combination with one or more of the first through fifth aspects, updating the spatial relation configuration of the UE includes updating first spatial settings of the spatial relation configuration of the UE for transmission in FR2 using the first spatial settings of the first spatial relation information.

In a seventh aspect, alone or in combination with one or more of the first through sixth aspects, the update identifies second spatial relation information associated with second spatial settings and second power control parameters, and updating the spatial relation configuration of the UE includes updating second spatial setting of the spatial relation configuration of the UE using the second spatial settings of the second spatial relation information.

In an eighth aspect, alone or in combination with one or more of the first through seventh aspects, the first spatial relation information is indicated by a bitmap in the MAC CE if a quantity of configured spatial relation information is less than or equal to 8 or a first spatial relation information ID comprising multiple bits in the MAC CE if the quantity of configured spatial relation information is greater than 8.

In a ninth aspect, alone or in combination with one or more of the first through eighth aspects, a second spatial relation information is indicated by the bitmap in the MAC CE if the quantity of configured spatial relation information is less than or equal to 8 or a second spatial relation information ID comprising multiple bits in the MAC CE if the quantity of configured spatial relation information is greater than 8.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
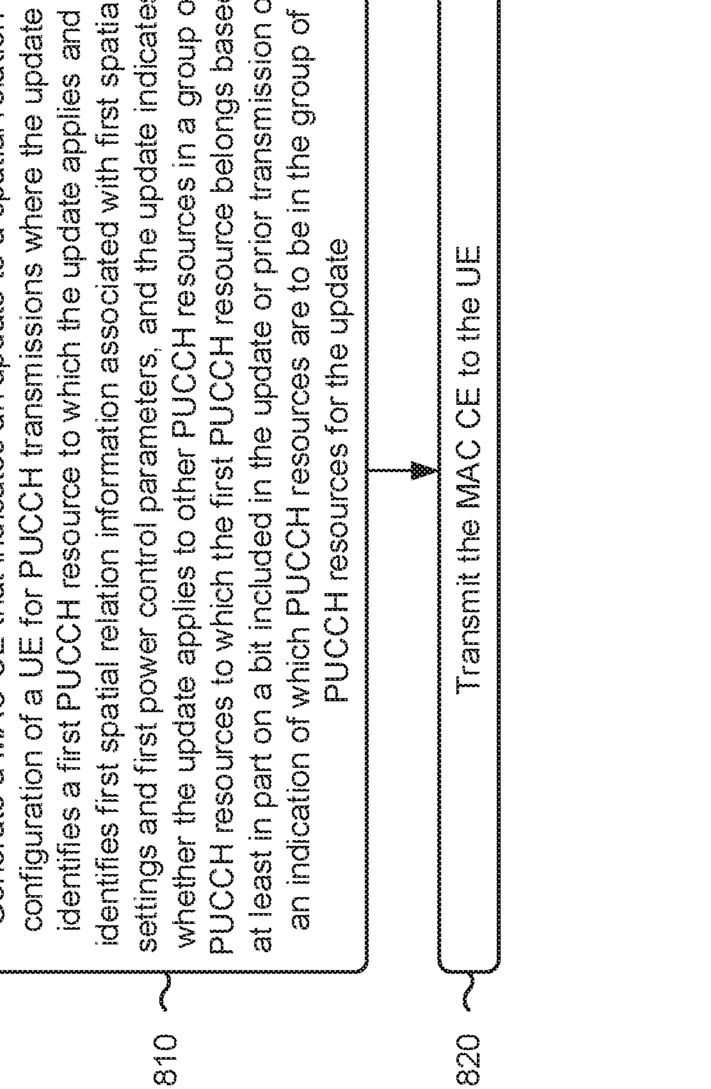
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110) performs operations associated with updating a spatial relation configuration of a UE with a MAC CE.

As shown in FIG. 8, in some aspects, process 800 may include generating a MAC CE that indicates an update to a spatial relation configuration of a UE for PUCCH transmissions (block 810). For example, the base station (e.g., using communication manager 150 and/or generation component 1008 depicted in FIG. 10) may generate a MAC CE that indicates an update to a spatial relation configuration of a UE for PUCCH transmissions, as described above, for example, with reference to FIGS. 3, 4, 5, and/or 6. In some aspects, the update identifies a first PUCCH resource to which the update applies and identifies first spatial relation information associated with first spatial settings and first power control parameters. In some aspects, the update indicates whether the update applies to other PUCCH resources in a group of PUCCH resources to which the first PUCCH resource belongs based at least in part on a bit included in the update or prior transmission of an indication of which PUCCH resources are to be in the group of PUCCH resources for the update.

As further shown in FIG. 8, in some aspects, process 800 may include transmitting the MAC CE to the UE (block 820). For example, the base station (e.g., using communication manager 150 and/or transmission component 1004 depicted in FIG. 10) may transmit the MAC CE to the UE, as described above, for example, with reference to FIGS. 3, 4, 5, and/or 6.

Process 800 may include additional aspects, such as any single aspect or any combination of aspects described below and/or in connection with one or more other processes described elsewhere herein.

In a first aspect, the update identifies second spatial relation information associated with second spatial settings and second power control parameters.

In a second aspect, alone or in combination with the first aspect, the MAC CE is to update a first set of power control parameters of the spatial relation configuration of the UE for transmission in FR1 using the first power control parameters of the first spatial relation information.

In a third aspect, alone or in combination with one or more of the first and second aspects, the MAC CE includes a bit to indicate whether the update is for an NUL carrier or for an SUL carrier.

In a fourth aspect, alone or in combination with one or more of the first through third aspects, the MAC CE is to update first spatial settings of the spatial relation configuration of the UE for transmission in FR2 using the first spatial settings of the first spatial relation information.

In a fifth aspect, alone or in combination with one or more of the first through fourth aspects, the MAC CE includes a bit or an LCID to indicate whether the update is for transmission in FR1 or for transmission in FR2. The LCID may include an eLCID.

In a sixth aspect, alone or in combination with one or more of the first through fifth aspects, the MAC CE includes a bitmap to indicate the first spatial relation information if a quantity of configured spatial relation information is less than or equal to 8 or a spatial relation information ID comprising multiple bits to indicate the first spatial relation information if the quantity of configured spatial relation information is greater than 8.

In a seventh aspect, alone or in combination with one or more of the first through sixth aspects, a second spatial relation information is indicated by the bitmap in the MAC CE if the quantity of configured spatial relation information is less than or equal to 8 or a second spatial relation information ID comprising multiple bits in the MAC CE if the quantity of configured spatial relation information is greater than 8.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
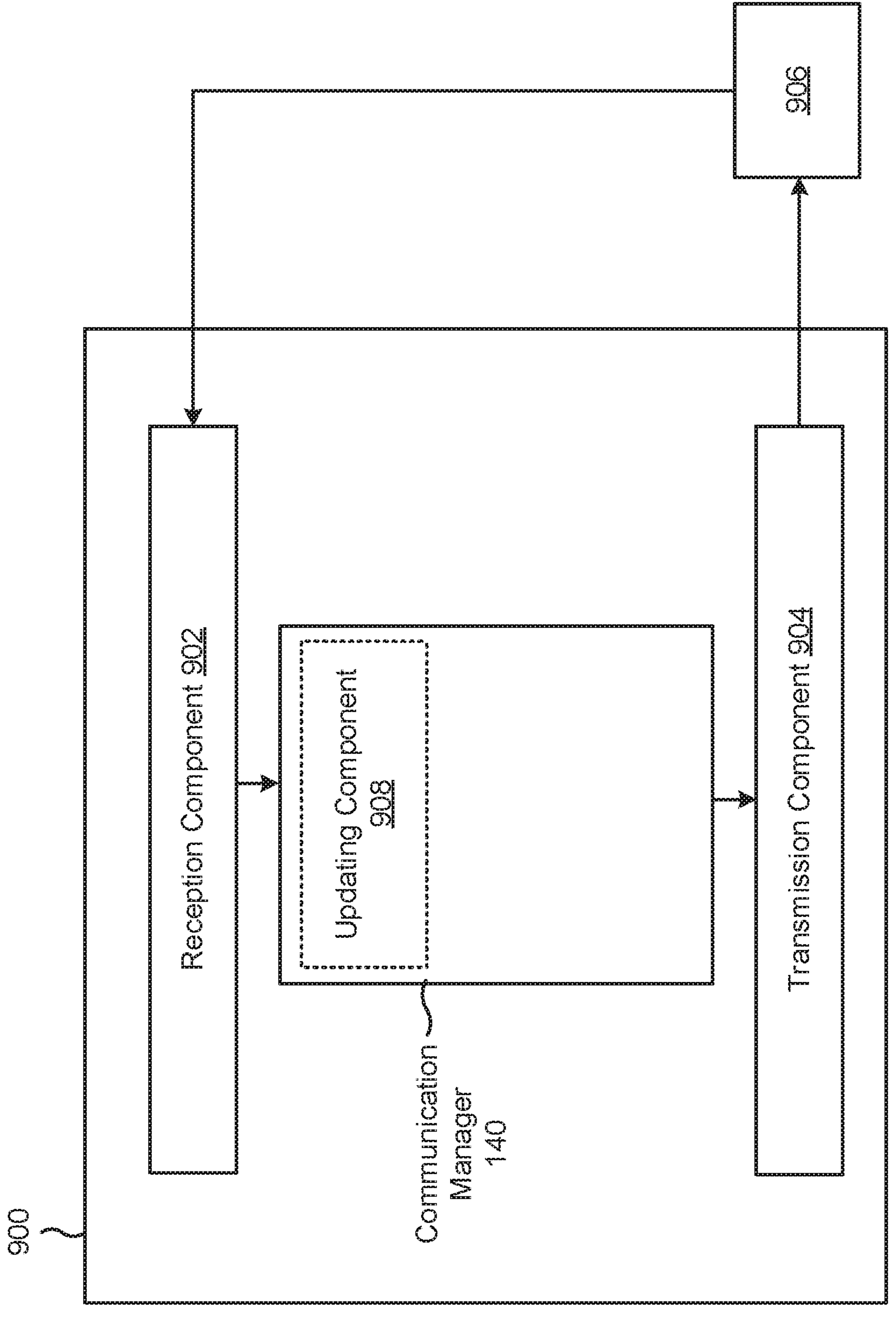
FIGS. 9-10 are diagrams of example apparatuses for wireless communication, in accordance with the present disclosure.

FIG. 9 is a diagram of an example apparatus 900 for wireless communication. The apparatus 900 may be a UE (e.g., UE 120), or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include an updating component 908, among other examples.

In some aspects, the apparatus 900 may be configured to perform one or more operations described herein in connection with FIGS. 1-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive a MAC CE that indicates an update to a spatial relation configuration of the UE for PUCCH transmissions, where the update identifies a first PUCCH resource to which the update applies and identifies first spatial relation information associated with first spatial settings and first power control parameters, and where the update further applies to other PUCCH resources in a group of PUCCH resources to which the first PUCCH resource belongs based at least in part on a bit included in the update or an indication of which PUCCH resources are to be in the group of PUCCH resources for the update. The updating component 908 may update, using the first spatial relation information, the spatial relation configuration of the UE for any combination of the first PUCCH resource or the other PUCCH resources in the group of PUCCH resources. The transmission component 904 may transmit a PUCCH communication on at least the first PUCCH resource.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally. or alternatively, a set of (one or more) components shown in FIG. 9 may perform one or more functions described as being performed by another set of components shown in FIG. 9.

Figure 10:
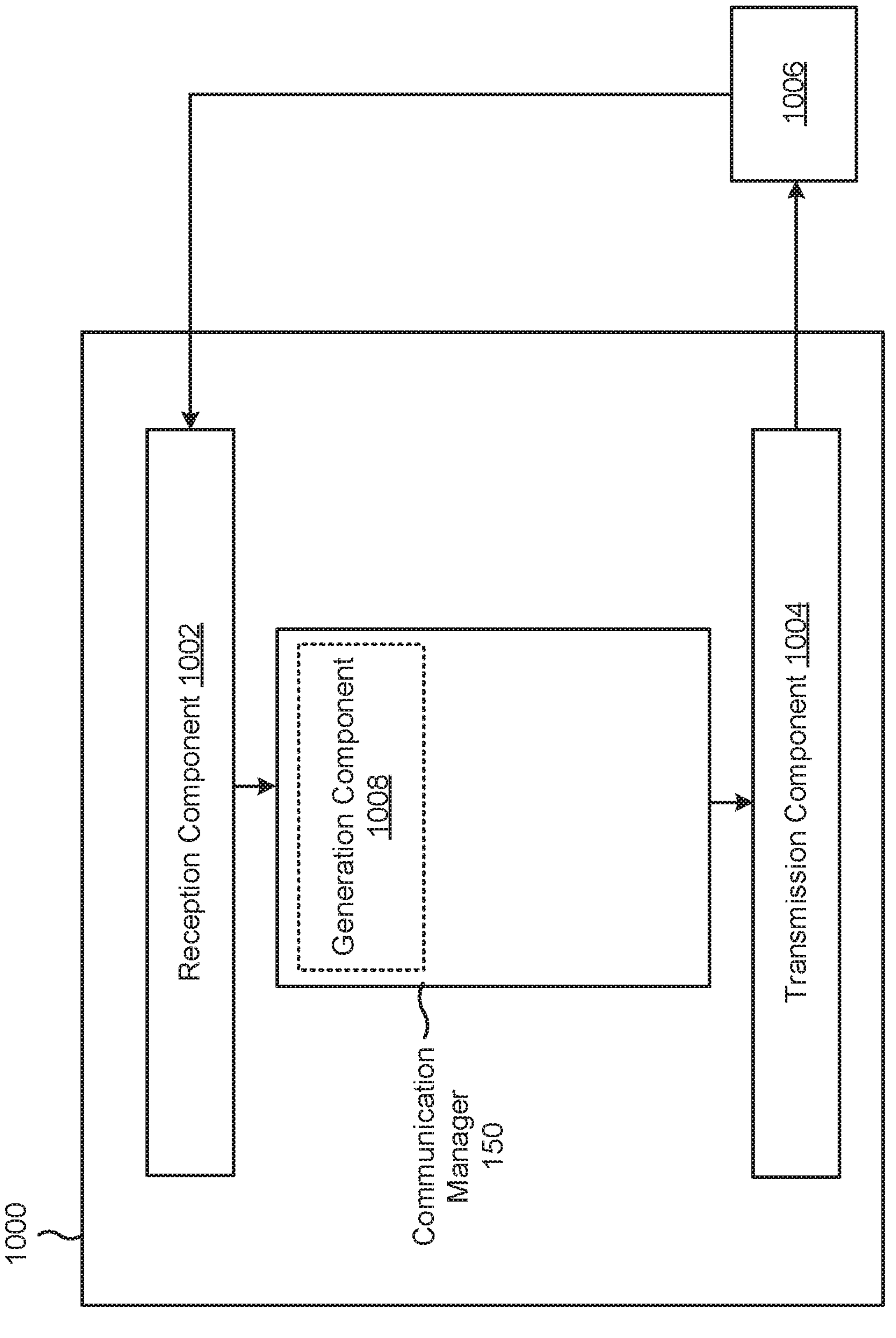

FIG. 10 is a diagram of an example apparatus 1000 for wireless communication. The apparatus 1000 may be a base station (e.g., base station 110), or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a generation component 1008, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The generation component 1008 may generate a MAC CE that indicates an update to a spatial relation configuration of a UE for PUCCH transmissions, where the update identifies a first PUCCH resource to which the update applies and identifies first spatial relation information associated with first spatial settings and first power control parameters, and where the update indicates whether the update applies to other PUCCH resources in a group of PUCCH resources to which the first PUCCH resource belongs based at least in part on a bit included in the update or prior transmission of an indication of which PUCCH resources are to be in the group of PUCCH resources for the update. The transmission component 1004 may transmit the MAC CE to the UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving a medium access control (MAC) control element (CE) that indicates an update to a spatial relation configuration of the UE for physical uplink control channel (PUCCH) transmissions, wherein the update identifies a first PUCCH resource to which the update applies and identifies first spatial relation information associated with first spatial settings and first power control parameters, and wherein the update further applies to other PUCCH resources in a group of PUCCH resources to which the first PUCCH resource belongs based at least in part on a bit included in the update or an indication of which PUCCH resources are to be in the group of PUCCH resources for the update;

updating, using the first spatial relation information, the spatial relation configuration of the UE for any combination of the first PUCCH resource or the other PUCCH resources in the group of PUCCH resources; and transmitting a PUCCH communication on at least the first PUCCH resource.

Aspect 2: The method of Aspect 1, wherein updating the spatial relation configuration of the UE includes updating a first set of power control parameters of the spatial relation configuration of the UE for transmission in frequency range 1 (FR1) using the first power control parameters of the first spatial relation information and refraining from using the first spatial settings of the first spatial relation information.

Aspect 3: The method of Aspect 2, wherein the update identifies second spatial relation information associated with second spatial settings and second power control parameters, and wherein updating the spatial relation configuration of the UE includes updating a second set of power control parameters of the spatial relation configuration using the second power control parameters of the second spatial relation information and refraining from using the second spatial settings of the second spatial relation information.

Aspect 4: The method of Aspect 2 or 3, wherein updating the spatial relation configuration of the UE for transmission in FR1 includes updating the spatial relation configuration for a normal uplink carrier or for a supplemental uplink carrier based at least in part on a bit in the MAC CE.

Aspect 5: The method of any of Aspects 1-4, wherein the UE is operating using carrier aggregation, and wherein the method further comprises determining whether the update applies to transmission in frequency range 1 (FR1) or transmission in frequency range 2 (FR2) based at least in part on a logical channel identifier (LCID) in the MAC CE.

Aspect 6: The method of any of Aspects 1-5, wherein the UE is operating using carrier aggregation, and wherein the method further comprises determining whether the update applies to transmission in frequency range 1 (FR1) or transmission in frequency range 2 (FR2) based at least in part on a bit in the MAC CE.

Aspect 7: The method of Aspect 5 or 6, wherein updating the spatial relation configuration of the UE includes updating first spatial settings of the spatial relation configuration of the UE for transmission in frequency range 2 (FR2) using the first spatial settings of the first spatial relation information.

Aspect 8: The method of Aspect 7, wherein the update identifies second spatial relation information associated with second spatial settings and second power control parameters, and wherein updating the spatial relation configuration of the UE includes updating second spatial setting of the spatial relation configuration of the UE using the second spatial settings of the second spatial relation information.

Aspect 9: The method of any of Aspects 1-8, wherein the first spatial relation information is indicated by a bitmap in the MAC CE if a quantity of configured spatial relation information is less than or equal to 8 or a first spatial relation information identifier comprising multiple bits in the MAC CE if the quantity of configured spatial relation information is greater than 8.

Aspect 10: The method of Aspect 9, wherein a second spatial relation information is indicated by the bitmap in the MAC CE if the quantity of configured spatial relation information is less than or equal to 8 or a second spatial relation information identifier comprising multiple bits in the MAC CE if the quantity of configured spatial relation information is greater than 8.

Aspect 11: A method of wireless communication performed by abase station, comprising: generating a medium access control (MAC) control element (CE) that indicates an update to a spatial relation configuration of a user equipment (UE) for physical uplink control channel (PUCCH) transmissions, wherein the update identifies a first PUCCH resource to which the update applies and identifies first spatial relation information associated with first spatial settings and first power control parameters, and wherein the update indicates whether the update applies to other PUCCH resources in a group of PUCCH resources to which the first PUCCH resource belongs based at least in part on a bit included in the update or prior transmission of an indication of which PUCCH resources are to be in the group of PUCCH resources for the update; and transmitting the MAC CE to the UE.

Aspect 12: The method of Aspect 11, wherein the update identifies second spatial relation information associated with second spatial settings and second power control parameters.

Aspect 13: The method of Aspect 11 or 12, wherein the MAC CE is to update a first set of power control parameters of the spatial relation configuration of the UE for transmission in frequency range 1 (FR1) using the first power control parameters of the first spatial relation information.

Aspect 14: The method of Aspect 13, wherein the MAC CE includes a bit to indicate whether the update is for a normal uplink carrier or for a supplemental uplink carrier.

Aspect 15: The method of Aspect 11 or 12, wherein the MAC CE is to update first spatial settings of the spatial relation configuration of the UE for transmission in frequency range 2 (FR2) using the first spatial settings of the first spatial relation information.

Aspect 16: The method of any of Aspects 11-15, wherein the MAC CE includes a bit or a logical channel identifier (LCID) to indicate whether the update is for transmission in frequency range 1 (FR1) or for transmission in frequency range 2 (FR2).

Aspect 17: The method of any of Aspects 11-16, wherein the MAC CE includes a bitmap to indicate the first spatial relation information if a quantity of configured spatial relation information is less than or equal to 8 or a spatial relation information identifier comprising multiple bits to indicate the first spatial relation information if the quantity of configured spatial relation information is greater than 8.

Aspect 18: The method of Aspect 17, wherein a second spatial relation information is indicated by the bitmap in the MAC CE if the quantity of configured spatial relation information is less than or equal to 8 or a second spatial relation information identifier comprising multiple bits in the MAC CE if the quantity of configured spatial relation information is greater than 8.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

receive a medium access control (MAC) control element (CE) that indicates an update to a spatial relation configuration or a set of power control parameters of the UE for physical uplink control channel (PUCCH) transmissions, wherein the update identifies a first PUCCH resource to which the update applies and identifies first spatial relation information or first power control parameters, and wherein the update further applies to other PUCCH resources in a group of PUCCH resources to which the first PUCCH resource belongs based at least in part on a bit included in the update or an indication of which PUCCH resources are to be in the group of PUCCH resources for the update;

determine, based at least in part on a logical channel identifier (LCID) in the MAC CE, whether the update applies to the spatial relation configuration or the set of power control parameters of the UE;

update, based at least in part on the MAC CE, the spatial relation configuration or the set of power control parameters of the UE for any combination of the first PUCCH resource or the other PUCCH resources in the group of PUCCH resources; and transmit a PUCCH communication on at least the first PUCCH resource.

2. The UE of claim 1, wherein the one or more processors, to update the spatial relation configuration of the UE, are configured to update a first set of power control parameters of the UE for transmission in frequency range 1 (FR1) using the first power control parameters.

3. The UE of claim 2, wherein the update identifies second spatial relation information or second power control parameters, and wherein the one or more processors, to update the spatial relation configuration of the UE, are configured to update the spatial relation configuration using the second spatial relation information.

4. The UE of claim 2, wherein the one or more processors, to update the spatial relation configuration of the UE for transmission in FR1, are configured to update the spatial relation configuration for a normal uplink carrier or for a supplemental uplink carrier based at least in part on a bit in the MAC CE.

5. The UE of claim 1, wherein the UE is operating using carrier aggregation, and wherein the one or more processors are configured to determine whether the update applies to transmission in frequency range 1 (FR1) or transmission in frequency range 2 (FR2) based at least in part on the LCID in the MAC CE.

6. The UE of claim 1, wherein the UE is operating using carrier aggregation, and wherein the one or more processors are configured to determine whether the update applies to transmission in frequency range 1 (FR1) or transmission in frequency range 2 (FR2) based at least in part on a bit in the MAC CE.

7. The UE of claim 1, wherein the one or more processors, to update the spatial relation configuration of the UE, are configured to update first spatial settings of the spatial relation configuration of the UE for transmission in frequency range 2 (FR2) using the first spatial settings of the first spatial relation information.

8. The UE of claim 7, wherein the update identifies second spatial relation information associated with second spatial settings, and wherein the one or more processors, to update the spatial relation configuration of the UE, are configured to update second spatial setting of the spatial relation configuration of the UE using the second spatial settings of the second spatial relation information.

9. The UE of claim 1, wherein the first spatial relation information is indicated by a bitmap in the MAC CE if a quantity of configured spatial relation information is less than or equal to 8 or a first spatial relation information identifier comprising multiple bits in the MAC CE if the quantity of configured spatial relation information is greater than 8.

10. The UE of claim 9, wherein a second spatial relation information is indicated by the bitmap in the MAC CE if the quantity of configured spatial relation information is less than or equal to 8 or a second spatial relation information identifier comprising multiple bits in the MAC CE if the quantity of configured spatial relation information is greater than 8.

11. A base station for wireless communication, comprising:

a memory; and one or more processors, coupled to the memory, configured to:

generate a medium access control (MAC) control element (CE) that indicates an update to a spatial relation configuration or a set of power control parameters of a user equipment (UE) for physical uplink control channel (PUCCH) transmissions, wherein the update identifies a first PUCCH resource to which the update applies and identifies first spatial relation information or first power control parameters, wherein the update indicates whether the update applies to other PUCCH resources in a group of PUCCH resources to which the first PUCCH resource belongs based at least in part on a bit included in the update or prior transmission of an indication of which PUCCH resources are to be in the group of PUCCH resources for the update, and wherein a logical channel identifier (LCID) in the MAC CE indicates whether the update applies to the spatial relation configuration or the set of power control parameters of the UE; and transmit the MAC CE to the UE.

12. The base station of claim 11, wherein the update identifies second spatial relation information associated with the spatial relation configuration.

13. The base station of claim 11, wherein the MAC CE is to update a first set of power control parameters of the UE for transmission in frequency range 1 (FR1) using the first power control parameters.

14. The base station of claim 13, wherein the MAC CE includes a bit to indicate whether the update is for a normal uplink carrier or for a supplemental uplink carrier.

15. The base station of claim 11, wherein the MAC CE is to update first spatial settings of the spatial relation configuration of the UE for transmission in frequency range 2 (FR2) using the first spatial settings of the first spatial relation information.

16. The base station of claim 11, wherein the LCID indicates whether the update is for transmission in frequency range 1 (FR1) or for transmission in frequency range 2 (FR2).

17. The base station of claim 11, wherein the MAC CE includes a bitmap to indicate the first spatial relation information if a quantity of configured spatial relation information is less than or equal to 8 or a spatial relation information identifier comprising multiple bits to indicate the first spatial relation information if the quantity of configured spatial relation information is greater than 8.

18. The base station of claim 17, wherein a second spatial relation information is indicated by the bitmap in the MAC CE if the quantity of configured spatial relation information is less than or equal to 8 or a second spatial relation information identifier comprising multiple bits in the MAC CE if the quantity of configured spatial relation information is greater than 8.

19. A method of wireless communication performed by a user equipment (UE), comprising:

receiving a medium access control (MAC) control element (CE) that indicates an update to a spatial relation configuration or a set of power control parameters of the UE for physical uplink control channel (PUCCH) transmissions, wherein the update identifies a first PUCCH resource to which the update applies and identifies first spatial relation information or first power control parameters, and wherein the update further applies to other PUCCH resources in a group of PUCCH resources to which the first PUCCH resource belongs based at least in part on a bit included in the update or an indication of which PUCCH resources are to be in the group of PUCCH resources for the update;

determining, based at least in part on a logical channel identifier (LCID) in the MAC CE, whether the update applies to the spatial relation configuration or the set of power control parameters of the UE;

updating, based at least in part on the MAC CE, the spatial relation configuration or the set of power control parameters of the UE for any combination of the first PUCCH resource or the other PUCCH resources in the group of PUCCH resources; and transmitting a PUCCH communication on at least the first PUCCH resource.

20. The method of claim 19, wherein updating the spatial relation configuration of the UE includes updating a first set of power control parameters of the UE for transmission in frequency range 1 (FR1) using the first power control parameters.

21. The method of claim 20, wherein the update identifies second spatial relation information or second power control parameters, and wherein updating the spatial relation configuration of the UE includes updating the spatial relation configuration using the second spatial relation information.

22. The method of claim 20, wherein updating the spatial relation configuration of the UE for transmission in FR1 includes updating the spatial relation configuration for a normal uplink carrier or for a supplemental uplink carrier based at least in part on a bit in the MAC CE.

23. The method of claim 19, wherein the UE is operating using carrier aggregation, and wherein the method further comprises determining whether the update applies to transmission in frequency range 1 (FR1) or transmission in frequency range 2 (FR2) based at least in part on the LCID in the MAC CE.

24. The method of claim 19, wherein updating the spatial relation configuration of the UE includes updating first spatial settings of the spatial relation configuration of the UE for transmission in frequency range 2 (FR2) using the first spatial settings of the first spatial relation information, wherein the update identifies second spatial relation information associated with second spatial settings, and wherein updating the spatial relation configuration of the UE includes updating second spatial setting of the spatial relation configuration of the UE using the second spatial settings of the second spatial relation information.

25. A method of wireless communication performed by a base station, comprising:

generating a medium access control (MAC) control element (CE) that indicates an update to a spatial relation configuration or a set of power control parameters of a user equipment (UE) for physical uplink control channel (PUCCH) transmissions, wherein the update identifies a first PUCCH resource to which the update applies and identifies first spatial relation information or first power control parameters, wherein the update indicates whether the update applies to other PUCCH resources in a group of PUCCH resources to which the first PUCCH resource belongs based at least in part on a bit included in the update or prior transmission of an indication of which PUCCH resources are to be in the group of PUCCH resources for the update, and wherein a logical channel identifier (LCID) in the MAC CE indicates whether the update applies to the spatial relation configuration or the set of power control parameters of the UE; and transmitting the MAC CE to the UE.

26. The method of claim 25, wherein the update identifies second spatial relation information associated with the spatial relation configuration.

27. The method of claim 25, wherein the MAC CE is to update a first set of power control parameters of the UE for transmission in frequency range 1 (FR1) using the first power control parameters.

28. The method of claim 27, wherein the MAC CE includes a bit to indicate whether the update is for a normal uplink carrier or for a supplemental uplink carrier.

29. The method of claim 25, wherein the MAC CE is to update first spatial settings of the spatial relation configuration of the UE for transmission in frequency range 2 (FR2) using the first spatial settings of the first spatial relation information.

30. The method of claim 25, wherein the LCID indicates whether the update is for transmission in frequency range 1 (FR1) or for transmission in frequency range 2 (FR2).

* * * * *